United States Patent
Himmelmann

(10) Patent No.: US 9,352,835 B2
(45) Date of Patent: May 31, 2016

(54) WEDGE LIFT JACKING SYSTEM FOR CRAWLER SUPPORTED AIRCRAFT LOADING ROBOT

(71) Applicant: GOODRICH CORPORATION, Charlotte, NC (US)

(72) Inventor: Richard A. Himmelmann, Beloit, WI (US)

(73) Assignee: Goodrich Corporation, Charlotte, NC (US)

( * ) Notice: Subject to any disclaimer, the term of this patent is extended or adjusted under 35 U.S.C. 154(b) by 113 days.

(21) Appl. No.: 14/511,645

(22) Filed: Oct. 10, 2014

(65) Prior Publication Data

US 2016/0101858 A1     Apr. 14, 2016

(51) Int. Cl.
*B65G 13/02*     (2006.01)
*B64D 9/00*      (2006.01)

(52) U.S. Cl.
CPC ............ *B64D 9/00* (2013.01); *B64D 2009/006* (2013.01)

(58) Field of Classification Search
CPC ........................................................ B64D 9/00
USPC .......... 198/782, 486.9; 193/35 SS; 244/118.1
See application file for complete search history.

(56) References Cited

U.S. PATENT DOCUMENTS

| | | |
|---|---|---|
| 3,055,446 A | 9/1962 | Vaughen |
| 3,190,460 A | 6/1965 | Rubin |
| 3,209,929 A | 10/1965 | Petersen et al. |
| 3,513,934 A | 5/1970 | Crowley |
| 3,597,117 A | 8/1971 | Zoehfeld |
| 3,756,544 A | 9/1973 | Bader |
| 3,773,391 A | 11/1973 | Crandall et al. |
| 3,809,268 A | 5/1974 | Lutz |
| 3,908,785 A | 9/1975 | Vaughen |
| 3,986,605 A | 10/1976 | Dooley et al. |
| 4,131,320 A | 12/1978 | Volat et al. |
| 4,139,071 A | 2/1979 | Tackett |
| 4,216,927 A * | 8/1980 | Byrd ................. B64D 9/00 220/1.5 |
| 4,353,457 A | 10/1982 | Haley |

(Continued)

FOREIGN PATENT DOCUMENTS

| | | |
|---|---|---|
| AU | 442872 | 11/1973 |
| BE | 723545 | 4/1969 |

(Continued)

OTHER PUBLICATIONS

Notice of Allowance dated Oct. 19, 2015 in U.S. Appl. No. 14/512,000.

(Continued)

*Primary Examiner* — Gene Crawford
*Assistant Examiner* — Lester Rushin

(57) ABSTRACT

A cargo management system is described having a slide bushing supported cargo shuttle. The cargo shuttle includes an aft bushing slide plate and a forward bushing slide plate. The cargo shuttle also includes an aft wedge positioned between the top surface and the aft bushing slide plate. The cargo shuttle also includes a forward wedge positioned between the top surface and the forward bushing slide plate. The cargo shuttle also includes a top surface configured to be displaced upward as a first force is applied to the aft wedge and a second force is applied to the forward wedge. The cargo management system also includes an aft shuttle drive belt coupled to the cargo shuttle and a forward shuttle drive belt coupled to the cargo shuttle.

15 Claims, 6 Drawing Sheets

(56) References Cited

U.S. PATENT DOCUMENTS

| | | |
|---|---|---|
| 4,354,796 A | 10/1982 | Bergman |
| 4,600,169 A | 7/1986 | Koster et al. |
| 4,618,292 A | 10/1986 | Judge et al. |
| 4,676,699 A | 6/1987 | Leonov |
| 4,815,926 A | 3/1989 | Chaffee et al. |
| 4,951,770 A | 8/1990 | Vaughen |
| 5,137,367 A | 8/1992 | Madonia et al. |
| 5,207,115 A | 5/1993 | Takei |
| 5,311,973 A | 5/1994 | Tseng et al. |
| 5,350,270 A | 9/1994 | Stallard et al. |
| 5,634,636 A | 6/1997 | Jackson et al. |
| 5,690,567 A | 11/1997 | DeNijs et al. |
| 5,850,906 A | 12/1998 | Dean |
| 6,196,788 B1 | 3/2001 | Talbot et al. |
| 6,427,947 B1 | 8/2002 | Rohrlick et al. |
| 6,517,028 B2 | 2/2003 | Huber |
| 6,630,633 B1 | 10/2003 | Uber et al. |
| 7,073,994 B2 | 7/2006 | Huber et al. |
| 7,108,474 B2 | 9/2006 | Moriya et al. |
| 7,393,159 B2 | 7/2008 | Chang et al. |
| 7,494,004 B2 | 2/2009 | Stolyar et al. |
| 7,513,716 B2 | 4/2009 | Hayashi et al. |
| 7,695,235 B1 | 4/2010 | Rallis |
| 7,785,056 B2 | 8/2010 | Sanford et al. |
| 7,800,009 B2 | 9/2010 | Gochar, Jr. |
| 7,845,898 B2 * | 12/2010 | Rawdon ............. B64D 9/00 244/118.1 |
| 8,162,571 B2 | 4/2012 | Wada et al. |
| 8,602,204 B2 | 12/2013 | Yang et al. |
| 9,205,923 B1 | 12/2015 | Himmelmann |
| 9,284,130 B1 | 3/2016 | Himmelmann |
| 9,290,270 B2 | 3/2016 | Himmelmann |
| 2004/0241267 A1 | 12/2004 | Schultz |
| 2008/0011119 A1 | 1/2008 | Bartosch |
| 2008/0257692 A1 | 10/2008 | Wallace |
| 2011/0215198 A1 | 9/2011 | Panzram et al. |
| 2013/0075065 A1 | 3/2013 | Degner et al. |
| 2015/0225082 A1 | 8/2015 | Levron |

FOREIGN PATENT DOCUMENTS

| | | |
|---|---|---|
| CA | 903562 | 6/1972 |
| DE | 3440933 | 10/1985 |
| DE | 102008040751 | 1/2010 |
| DE | 102010035099 | 2/2012 |
| EP | 1547893 | 6/2005 |
| FR | 1360952 | 5/1964 |
| FR | 2340636 | 9/1977 |
| FR | 2448454 | 9/1980 |
| GB | 1210244 | 10/1970 |
| GB | 2182015 | 5/1987 |
| JP | 2000128322 | 5/2000 |
| WO | 8706909 | 11/1987 |
| WO | 8801975 | 3/1988 |
| WO | 9819940 | 5/1998 |
| WO | 0066463 | 11/2000 |
| WO | 2005028248 | 3/2005 |
| WO | 2005039036 | 4/2005 |
| WO | 2008091287 | 7/2008 |

OTHER PUBLICATIONS

Pre-Interview First Office Action dated Sep. 4, 2015 in U.S. Appl. No. 14/512,000.
Notice of Allowance dated Nov. 13, 2015 in U.S. Appl. No. 14/464,323.
Office Action dated Nov. 17, 2015 in U.S. Appl. No. 14/511,559.
Corrected Notice of Allowability Jan. 7, 2016 in U.S. Appl. No. 14/464,323.
Preinterview First Office Action dated Jan. 7, 2016 in U.S. Appl. No. 14/512,113.
Nlotice of Allowance dated Jan. 20, 2016 in U.S. Appl. No. 14/511,553.
Extended European Search Report dated Feb. 9, 2016 in European Application No. 15181603.0.
Extended European Search Report dated Feb. 11, 2016 in European Application No. 15189145.4.
Extended European Search Report dated Feb. 18, 2016 in European Application No. 15189116.5.
Extended European Search Report dated Feb. 18, 2016 in European Application No. 15189127.2.
Extended European Search Report dated Feb. 19, 2016 in European Application No. 15189129.8.
Extended European Search Report dated Mar. 7, 2016 in European Application No. 15189114.0.
Extended European Search Report dated Mar. 11, 2016 in European Application No. 15189140.5.
Extended European Search Report dated Mar. 11, 2016 in European Application No. 15189107.4.
Extended European Search Report dated Mar. 11, 2016 in European Application No. 15189119.9.
Extended European Search Report dated Mar. 14, 2016 in European Application No. 15189121.5.
Extended European Search Report dated Mar. 16, 2016 in European Application No. 15189124.9.
Notice of Allowance dated Mar. 24, 2016 in U.S. Appl. No. 14/512,113.

* cited by examiner

WEDGE LIFT JACKING SYSTEM FOR CRAWLER SUPPORTED AIRCRAFT LOADING ROBOT

FIELD

The present disclosure relates generally to cargo management systems.

BACKGROUND

Conventional aircraft cargo systems typically include various tracks and rollers that span the length of an aircraft. Power drive units ("PDUs") convey cargo forward and aft along the aircraft on conveyance rollers which are attached to the aircraft floor structure. Cargo may be loaded from an aft position on an aircraft and conducted by the cargo system to a forward position and/or, depending upon aircraft configuration, cargo may be loaded from a forward position on an aircraft and conducted by the cargo system to an aft position. Conventional systems are typically designed to accommodate a particular pallet size. Conventional systems are typically comprised of numerous components that may be time consuming to install, replace and maintain.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A cargo management system is described having a slide bushing supported cargo shuttle. The slide bushing supported cargo shuttle includes an aft bushing slide plate and a forward bushing slide plate. The slide bushing supported cargo shuttle also includes an aft wedge positioned between the top surface and the aft bushing slide plate. The slide bushing supported cargo shuttle also includes a forward wedge positioned between the top surface and the forward bushing slide plate. The slide bushing supported cargo shuttle also includes a top surface configured to be displaced upward as a first force is applied to the aft wedge and a second force is applied to the forward wedge. The cargo management system also includes an aft shuttle drive belt coupled to the slide bushing supported cargo shuttle and a forward shuttle drive belt coupled to the slide bushing supported cargo shuttle.

Also described is a slide bushing supported cargo shuttle. The slide bushing supported cargo shuttle includes an aft bushing slide plate, a forward bushing slide plate and a top surface that is adapted to be displaced upward. The slide bushing supported cargo shuttle also includes an aft wedge positioned between the aft bushing slide plate and the top surface. The aft wedge is coupled to an aft shuttle drive belt that is adapted to apply an aft-ward force to the aft wedge. The slide bushing supported cargo shuttle also includes a forward wedge positioned between the forward bushing slide plate and the top surface. The forward wedge is coupled to a forward shuttle drive belt that is adapted to apply forward force to the forward wedge. The slide bushing supported cargo shuttle also includes an aft spring and damper assembly that is adapted to apply a forward threshold force to the aft wedge. The slide bushing supported cargo shuttle also includes a forward spring and damper assembly that is adapted to apply an aft-ward threshold force to the forward wedge.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option.

As used herein, "aft" refers to the direction associated with the tail of an aircraft, or generally, to the direction of exhaust of the gas turbine. As used herein, "forward" refers to the direction associated with the nose of an aircraft, or generally, to the direction of flight or motion.

Aircraft cargo management systems as disclosed herein allow cargo to be loaded into an aircraft and positioned within the aircraft in a simple, elegant manner. In that regard, aircraft cargo management systems as disclosed herein may reduce part count and associated replacement/wear costs over time.

Figure 1:
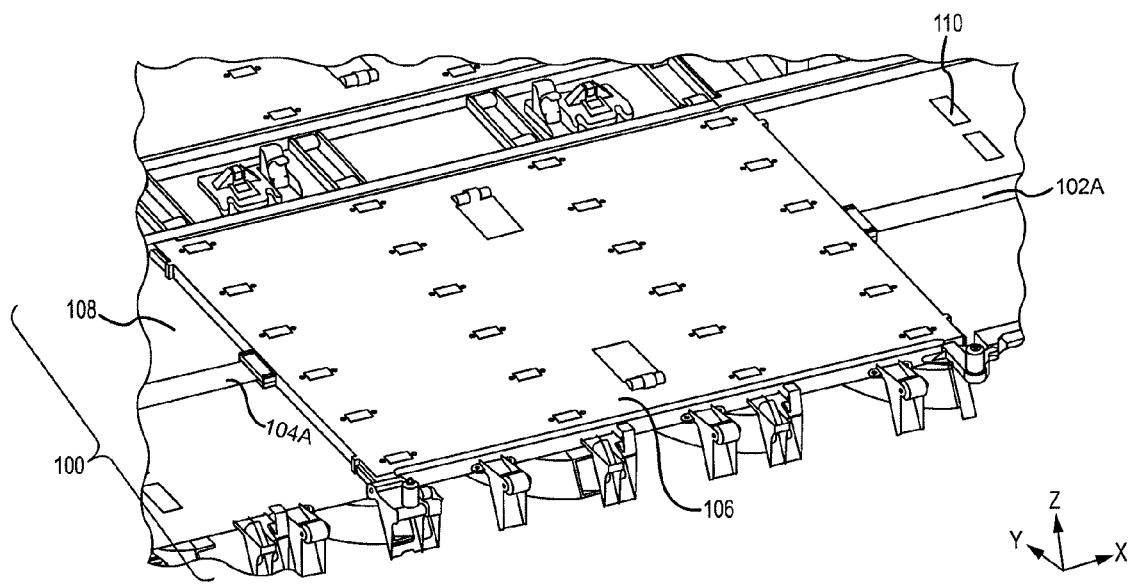
FIG. 1 illustrates a portion of a cargo management system, in accordance with various embodiments.
Figure 2:
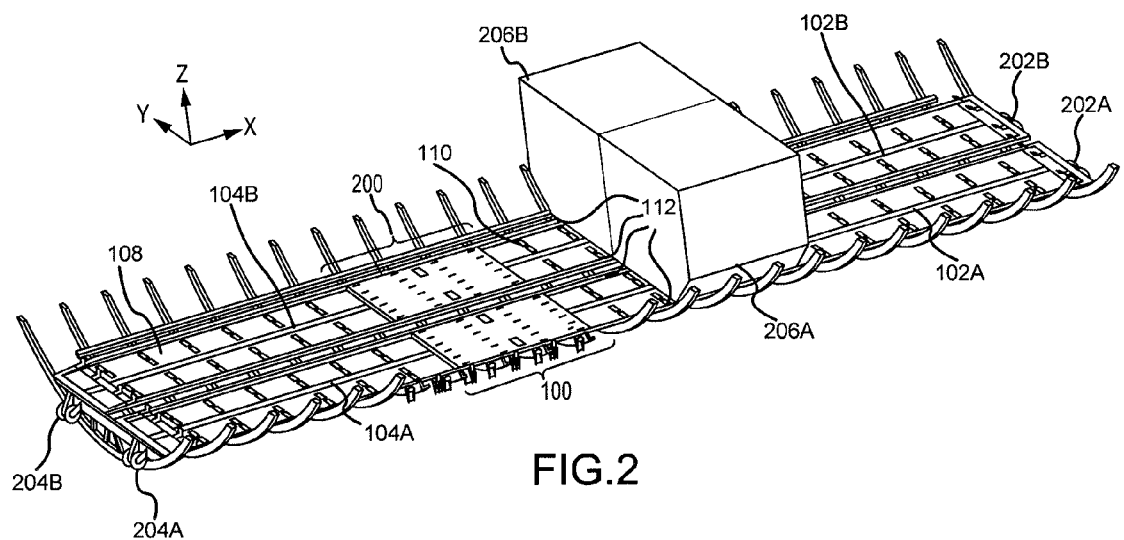
FIG. 2 illustrates a portion of a cargo management system, in accordance with various embodiments.

With reference to FIGS. 1 and 2 an aircraft cargo management system is illustrated using an x, y, and z axes for ease of illustration. Slide bushing supported cargo shuttle 100 and 200 are shown forward of an aft portion of an aircraft. Slide bushing supported cargo shuttle 100 is coupled to aft shuttle drive belt 104A and slide bushing supported cargo shuttle 200 is coupled to aft shuttle drive belt 104B. Aft shuttle drive belt 104A is coupled to aft shuttle drive unit 204A. Aft shuttle drive belt 104B is coupled to aft shuttle drive unit 204B. Floor panel 108 is shown beneath slide bushing supported cargo shuttle 100 and 200. As used with respect to slide bushing supported cargo shuttle 100 and 200, the term "beneath" may refer to a location of a first point further in the negative z direction relative to a second point. Support rails 112 are shown laterally adjacent to floor panel 108. Support rails 112 may be mounted to another aircraft component, such as an airframe, and may be capable of supporting the weight of cargo. Floor panel 108 may comprise a composite material and/or a metallic material. In various embodiments, floor panel 108 may not be included in the aircraft.

Slide bushing supported cargo shuttle 100 is coupled to forward shuttle drive belt 102A and slide bushing supported cargo shuttle 200 is coupled to forward shuttle drive belt 102B. Forward shuttle drive belt 102A is coupled to forward shuttle drive unit 202A. Forward shuttle drive belt 102B is coupled to forward shuttle drive unit 202B. Cargo 206A and cargo 206B are shown as resting on support rails 112. Two or more support rails 112 may exist for supporting each container of cargo 206. Slide bushing supported cargo shuttle 200 may be used to lift cargo 206A (e.g., in the positive z direction) off support rails 112 and move cargo 206A forward or aft.

Forward shuttle drive belt 102A, forward shuttle drive belt 102B, aft shuttle drive belt 104A, and aft shuttle drive belt 104B (collectively, a "shuttle belt") may comprise any suitable belt capable of pulling an air cushion slide bushing supported cargo shuttle. For example, a shuttle belt may comprise a flat belt, a rope, a cable, a nylon belt, a linked chain, a pin and roller chain or the like. In that regard, a flat shuttle belt may not occupy excess space along the z direction. For example, a shuttle belt may comprise a polyurethane coated belt that includes a communications and power bus. In that regard, the structural support and power/data functions are provided by a single shuttle belt structure. For example, in various embodiments, a shuttle belt may comprise steel wires oriented in parallel and coated with polyurethane to hold the steel wires together, provide anti-friction properties, and noise dampening properties. Among the steel wires may be copper wires or other wires that are capable of carrying an electrical current at any suitable voltage. In that regard, the shuttle belt may comprise one or more copper wires to carry high voltage power and/or low voltage electrical signals that may convey data.

The shuttle belts may be wound around a portion of forward shuttle drive unit 202A, forward shuttle drive unit 202B, aft shuttle drive unit 204A and aft shuttle drive unit 204B (collectively, "shuttle drive unit"). In that regard, a shuttle drive unit may comprise a cylindrical structure (e.g., a bobbin) to which a shuttle belt is affixed. The shuttle drive unit comprises a motive device, such as an electric motor, to rotate the bobbin in a desired direction. The shuttle drive unit may also disengage the electric motor or be otherwise geared in such a manner so that free rotation of the bobbin is allowed.

Figure 3:
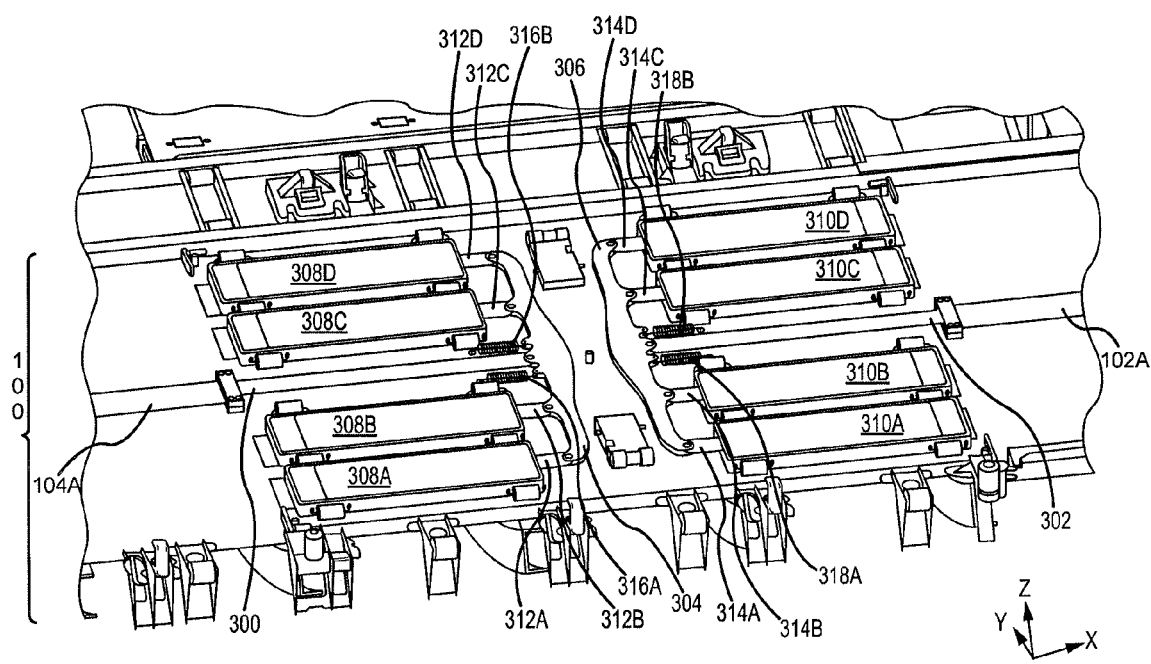
FIG. 3 illustrates a slide bushing supported cargo shuttle without a top surface, in accordance with various embodiments.

FIG. 3 illustrates slide bushing supported cargo shuttle 100 without top surface 106 attached. Aft shuttle drive belt 104A is attached to aft shuttle drawbar 300. Aft shuttle drawbar 300 is attached to aft translating lift beam 304. Aft shuttle drawbar 300 is a bar that transfers force from aft shuttle drive belt 104A to aft translating lift beam 304. When tension is applied to aft shuttle drive belt 104A, aft shuttle drawbar 300 and aft translating lift beam 304 are moved in the aft (negative X) direction.

Aft translating lift beam 304 is attached to aft wedge 312A, 312B, 312C and 312D. Aft translating lift beam 304 is a beam that transfers force from aft shuttle drawbar 300 to each aft wedge 312A, 312B, 312C and 312D. Aft wedges 312 have aft bushings 308 positioned between aft wedges 312 and top surface 106. Aft bushings 308 allow aft wedges 312 to move between an engaged position (aft, the negative X direction) and a disengaged position (forward, the positive X direction) underneath top surface 106. Aft bushings 308 may be any type of bushing, such as fiber reinforced, self-lubricating polymer bushings. When engaged, aft wedges 312 lift top surface 106 in the positive Z direction, such that cargo 206A is raised above support rails 112. When disengaged, top surface 106 is positioned low enough on the Z axis for cargo 206A to rest on support rails 112.

Aft return springs and dampers 316 are positioned such that they apply force to aft translating lift beam 304 and aft wedges 312 in the positive X direction. When aft shuttle drive belt 104A is not in tension (or the tension is below a threshold tension level), return springs and dampers 316 will cause aft wedges 312 to be in a disengaged position. Therefore, top surfaces 106 of slide bushing supported cargo shuttle 100 will not lift unless an overcoming force is applied by aft shuttle drive belt 104A. When overcoming force is applied by aft shuttle drive belt 104A, aft wedges 312 are forced in the negative X direction, which in turn forces top surface 106 in the positive Z direction. This in turn raises cargo 206A from support rails 112 such that slide bushing supported cargo shuttle 100 can be moved forward or aft over bushings 110.

Forward shuttle drive belt 102A is attached to forward shuttle drawbar 302. Forward shuttle drawbar 302 is attached to forward translating lift beam 306. When sufficient tension is applied in the forward direction (positive X direction) to forward shuttle drive belt 102A, forward translating lift beam 306 is moved in the forward direction. Forward translating lift beam 306 is attached to forward wedges 314, which are positioned underneath top surface 106. Forward bushings 310 are positioned between forward wedges 314 and top surface 106 in order to allow forward wedges 314 to freely move forward and aft underneath top surface 106. In response to forward translating lift beam 306 moving forward, forward wedges 314 are engaged (moved in the positive X direction) underneath top surface 106, thus forcing top surface 106 upward (positive Z direction). When the threshold tension is not applied to forward shuttle drive belt 102A, forward wedges 314 are disengaged (positioned in the negative X direction from the engaged position).

Forward return springs and dampers 318 are positioned in such a way as to force forward translating lift beam 306 and forward wedges 314 in the negative X direction. This force ensures that without threshold force being applied to forward wedges 314 in the positive X direction, forward wedges 314 remain disengaged. This movement prevents top surface 106 from moving in the positive Z direction unless an overcoming force is applied by forward shuttle drive belt 102A.

Returning now to FIGS. 1 and 2, Cargo 206A rests on top surface 106 of slide bushing supported cargo shuttle 100. Slide bushing supported cargo shuttle 100 may raise cargo 206A from support rails 112 (i.e., move in the positive Z direction) by applying tension to both aft shuttle drive belt 104A and forward shuttle drive belt 102A. Applying this tension causes top surface 106 of slide bushing supported cargo shuttle 100 to raise from floor panel 108 (or support rails 112). Tension may be applied to aft shuttle drive belt 104A by rotating the bobbin on aft shuttle drive unit 204A. Tension may be applied to forward shuttle drive belt 102A by rotating the bobbin on forward shuttle drive unit 202A. Slide bushing supported cargo shuttle 200 may provide lift cargo 206A in the same manner.

In order to move slide bushing supported cargo shuttle 100 forward, more force may be applied to forward shuttle drive belt 102A than aft shuttle drive belt 104A. To move slide bushing supported cargo shuttle 100 aft, more force may be applied to aft shuttle drive belt 104A than forward shuttle drive belt 102A. Slide bushing supported cargo shuttle 200 may move forward and aft in the same manner.

In order to unload cargo 206A from slide bushing supported cargo shuttle, tension may be released from aft shuttle drive belt 104A and forward shuttle drive belt 102A. This lack of tension will cause top surface 106 to move in the negative Z direction back towards floor panel 108 (or support rails 112). Cargo 206A will rest on support rails 112 in response to tension release from aft shuttle drive belt 104A and forward shuttle drive belt 102A. Slide bushing supported cargo shuttle 100 may then be moved forward or aft by applying tension to forward shuttle drive belt 102A or aft shuttle drive belt 104A.

Slide bushing supported cargo shuttle 100 and 200 may glide over bushings 110 when moving forward or aft. Bushings 110 may be plastic-based bushings. For example, bushings 110 may be fiber reinforced polymer self-lubricating bushings such as an internally lubricated, acetal-based material such as that sold under the trademark Turcite® T47 which is available from Trellebord Sealing Solutions, Fort Wayne, Ind. When slide bushing supported cargo shuttle 100 and/or 200 is providing lift to cargo 206A such that cargo 206A is lifted from support rails 112, or when no cargo is positioned on slide bushing supported cargo shuttle 100 and/or 200, slide bushing supported cargo shuttle 100 and/or 200 may move forward or aft, depending on tension applied to aft shuttle drive belt 104A and/or forward shuttle drive belt 102A. When moving forward or aft in a lifted or cargo-less state, slide bushing supported cargo shuttle 100 may glide over bushings 110 without or with few other friction contact points counteracting the movement of slide bushing supported cargo shuttle 100 and/or 200.

Figure 4:
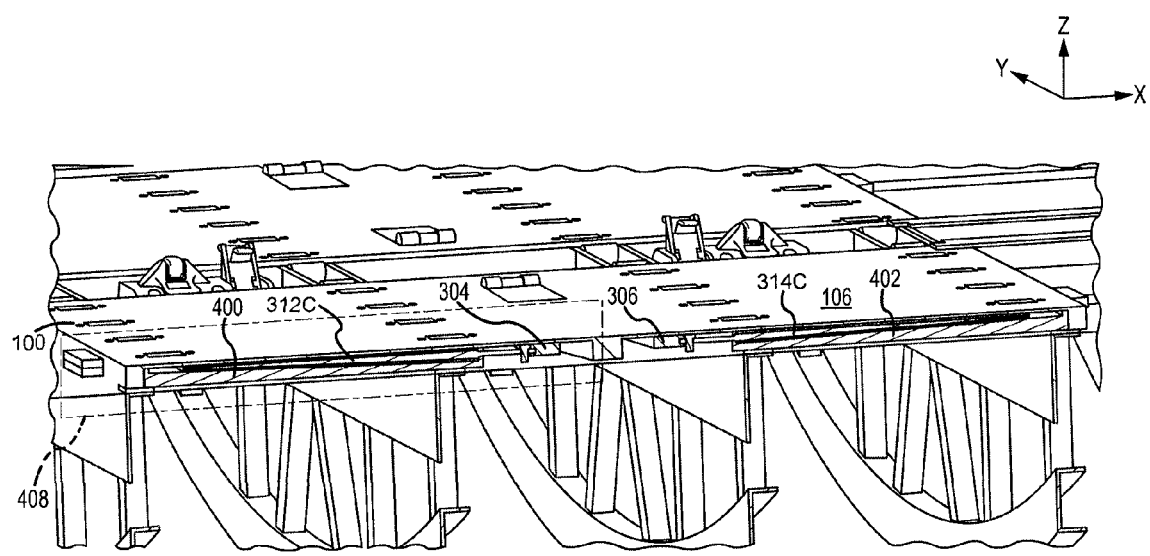
FIG. 4 illustrates a cross-sectional view of a slide bushing supported cargo shuttle, in accordance with various embodiments.

FIG. 4 illustrates a cross-sectional view of slide bushing supported cargo shuttle 100. The cross section illustrated in FIG. 4 includes top surface 106 and illustrates how wedges 312 and 314 provide lift to top surface 106. As illustrated, aft translating lift beam 304 is attached to aft wedge 312C. Aft wedge 312C narrows from the forward direction to the aftward direction. Aft wedge 312C is positioned between top surface and aft bushing slide plate 400. Aft bushing slide plate 400 may be positioned on bushings 110. Aft bushing slide plate 400 may be adapted to move in the forward and aft direction over bushings 110. In various embodiments, aft bushing slide plate 400 may have a top surface that is friction resistant, so that aft wedge 312C can easily move between an engaged and disengaged position between top surface 106 and aft bushing slide plate 400.

Not illustrated but extending in the aft (negative X) direction is aft shuttle drive belt 104A. When aft shuttle drive belt 104A is in sufficient tension to overcome the force exerted by return springs and dampers 316, aft wedge 312C becomes engaged (is moved in the aft direction). When aft wedge 312C is engaged, aft wedge 312C is forced between top surface 106 and aft bushing slide plate 400. Because aft wedge 312C narrows from the forward direction to the aft-ward direction, when it moves aft-ward between top surface 106 and aft bushing slide plate 400 it forces top surface 106 apart from aft bushing slide plate 400. Because aft bushing slide plate 400 is positioned adjacent floor panel, when top surface 106 and aft bushing slide plate 400 are forced apart, aft bushing slide plate 400 is restrained from downward motion (motion in the negative Z direction). Therefore, top surface 106 moves upward.

Forward translating lift beam 306 is attached to forward wedge 314C. When force is applied to forward shuttle drive belt 102A in the forward direction, forward wedge 314C moves in the forward direction and separates top surface 106 from forward bushing slide plate 412, raising top surface 106 upward, in the same manner that aft wedge 312C forces top surface 106 upward.

When aft shuttle drive belt 104A and forward shuttle drive belt 102A are exerting enough force to overcome aft return springs and dampers 316 and forward return springs and dampers 318, wedges 312 and 314 force top surface 106 apart from aft bushing slide plate 400 and forward bushing slide plate 402. Because aft bushing slide plate 400 and forward bushing slide plate 402 are positioned above and adjacent to floor panel 108, aft bushing slide plate 400 and forward bushing slide plate 402 are restrained from downward motion (in negative z direction). Therefore, top surface 106 moves upward.

Wedges 312C and 314C are adapted to raise top surface 106 and cargo 206A above support rails 112. When cargo 206A is lifted from support rails 112 in this fashion, more force can be applied to aft shuttle drive belt 104A than forward shuttle drive belt 102A, or forward shuttle drive belt 102A than aft shuttle drive belt 104A, in order to move slide bushing supported cargo shuttle 100 in the aft or forward direction. When slide bushing supported cargo shuttle 100 is moving aft or forward, aft bushing slide plate 400 and forward bushing slide plate 402 glide over bushings 110 positioned throughout floor panel 108. Bushings 110 may be supported by beams in various embodiments.

Figure 5:
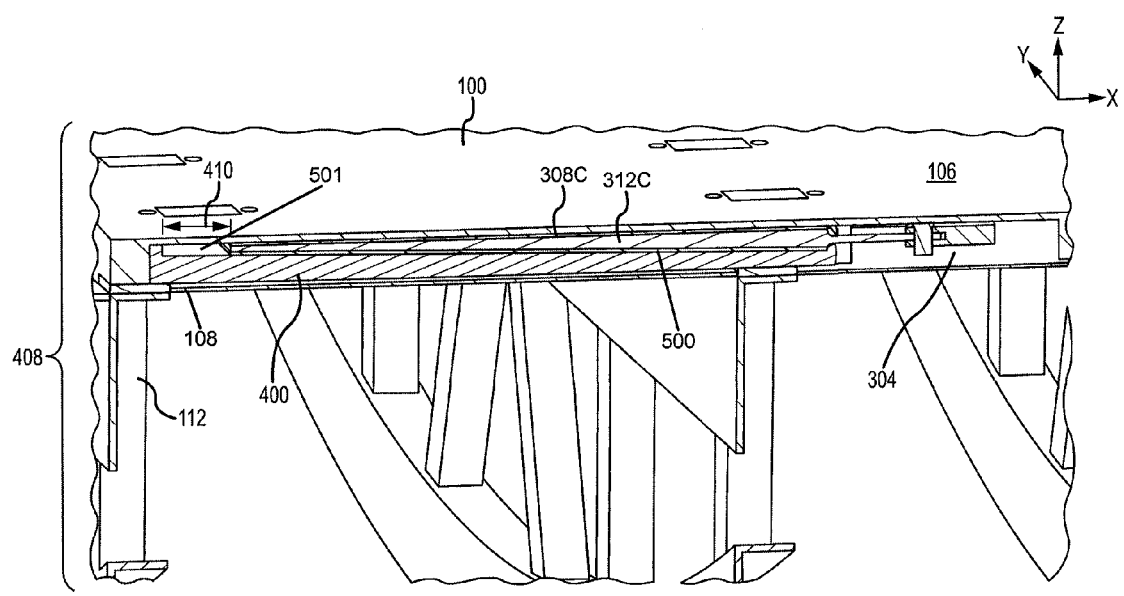
FIG. 5 illustrates a cross-sectional view of a portion of a slide bushing supported cargo shuttle with a disengaged wedge, in accordance with various embodiments.

FIG. 5 illustrates a cross-sectional view of portion 408 (as illustrated in FIG. 4) of slide bushing supported cargo shuttle 100. FIG. 5 illustrates slide bushing supported cargo shuttle 100 with aft wedge 312C disengaged such that top surface 106 not raised. As illustrated, aft translating lift beam 304 is attached to aft wedge 312C. Between aft wedge 312C and top surface 106 is aft bushing 308C. Between aft wedge 312C and aft bushing slide plate 400 is another bushing 500. Bushings 308C and 500 allow wedge 312C to move in the aft and forward direction between top surface 106 and aft bushing slide plate 400.

A gap 501 exists between top surface 106 and aft bushing slide plate 400 aft of aft wedge 312C. Gap 501 has a distance 410. When aft wedge 312C is engaged, it is moved into gap 501, displacing top surface 106 in an upward direction (positive z direction).

In various embodiments, top surface 106 may be displaced upward a quarter of an inch (6.35 mm) or less. Because cargo bays are designed to maximize space, room above cargo 206A may be limited. Therefore, the cargo system may be designed such that top surface 106 may only need to be displaced a distance of a quarter of an inch (6.35 mm) or less to lift cargo 206A from support rails 112.

Figure 6:
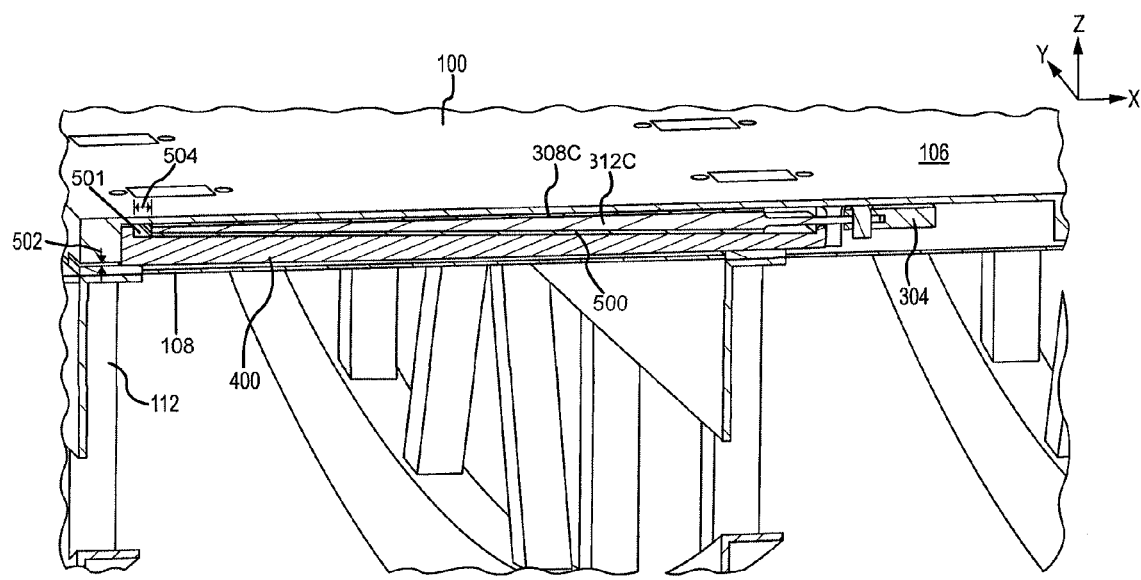
FIG. 6 illustrates a cross-sectional view of a portion of a slide bushing supported cargo shuttle with an engaged wedge, in accordance with various embodiments.

FIG. 6 illustrates a cross-sectional view of portion 408 (as illustrated in FIG. 4) of slide bushing supported cargo shuttle 100 with aft wedge 312C engaged. In FIG. 6, top surface 106 is displaced in an upward direction (positive z direction) from aft bushing slide plate 400. In FIG. 6, aft wedge 312C is positioned farther aft than in FIG. 5. As aft wedge 312C is positioned farther aft, gap 501 has a smaller distance 504 than distance 410. Aft wedge 312C forces aft bushing slide plate 400 and top surface 106 apart. This causes top surface 106 to be raised a distance 502 from aft bushing slide plate 400 (and accordingly, lifted a distance 502 from floor panel 108 or support rails 112). In response to top surface 106 being lifted from floor panel 108, cargo 206A is lifted from support rails 112. This allows slide bushing supported cargo shuttle 100, with cargo 206A, to be maneuvered forward or aft on floor panel 108 without friction or with little friction between cargo 206A and support rails 112.

In FIG. 6, aft shuttle drive belt 104A has been engaged (causing an aft-ward force above the threshold of aft return springs and dampers 316) causing aft translating lift beam 304 to move in the aft direction. Because aft wedge 312C is attached to aft translating wedge lift beam, aft wedge 312C is also moved aft into gap 501, causing top surface 106 to become displaced from floor panel 108.

In response to the force applied by aft shuttle drive belt 104A becoming less than the threshold force of aft return springs and dampers 316, aft return springs and dampers 316 cause aft wedge 312C to return to the position illustrated in FIG. 5. This causes top surface 106 to be lowered back down towards floor panel 108. In response to this, cargo 206A may rest on support rails 112, and slide bushing supported cargo shuttle 100 can be moved forward or aft away from cargo 206A.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A cargo management system comprising:
a slide bushing supported cargo shuttle having:
an aft wedge,
a forward wedge, and
a top surface positioned above the aft wedge and the forward wedge and configured to be displaced upward in response to a first force applied to the aft wedge and a second force applied to the forward wedge;
an aft shuttle drive belt coupled to the slide bushing supported cargo shuttle; and
a forward shuttle drive belt coupled to the slide bushing supported cargo shuttle.

2. The cargo management system of claim 1, wherein the slide bushing supported cargo shuttle includes:
an aft translating lift beam coupled to the aft wedge;
a forward translating lift beam coupled to the forward wedge;
an aft shuttle draw bar coupled to the aft translating lift beam and the aft shuttle drive belt; and
a forward shuttle draw bar coupled to the forward translating lift beam and the forward shuttle drive belt.

3. The cargo management system of claim 1, wherein the aft wedge includes 4 aft wedges and the forward wedge includes 4 forward wedges.

4. The cargo management system of claim 1, wherein the top surface is configured to be displaced less than 6.35 mm.

5. The cargo management system of claim 1, wherein:
the aft shuttle drive belt is configured to apply aft-ward force to the slide bushing supported cargo shuttle;
the forward shuttle drive belt is configured to apply forward force to the slide bushing supported cargo shuttle;
the slide bushing supported cargo shuttle is adapted to move aft-ward in response to more aft-ward force being applied to the slide bushing supported cargo shuttle than the forward force being applied to the slide bushing supported cargo shuttle; and
the slide bushing supported cargo shuttle is adapted to move forward in response to more forward force being applied to the slide bushing supported cargo shuttle than the aft-ward force being applied to the slide bushing supported cargo shuttle.

6. The cargo management system of claim 1, wherein:
the slide bushing supported cargo shuttle includes an aft bushing slide plate positioned beneath the aft wedge and a forward bushing slide plate positioned above the wedge; and
the top surface is configured to be displaced upward in response to the aft wedge being moved aft-ward between the top surface and the aft bushing slide plate and the forward wedge being moved forward between the top surface and the forward bushing slide plate.

7. The cargo management system of claim 6, wherein:
a first aft bushing is positioned between the aft bushing slide plate and the aft wedge;
a second aft bushing is positioned between the top surface and the aft wedge;
a first forward bushing is positioned between the forward bushing slide plate and the forward wedge; and a second forward bushing is positioned between the top surface and the forward wedge.

8. The cargo management system of claim 1, further comprising a floor panel having a plurality of bushings.

9. The cargo management system of claim 8, wherein the plurality of bushings are self-lubricating polymer bushings.

10. The cargo management system of claim 8, wherein the slide bushing supported cargo shuttle is adapted to move forward or aft-ward over the plurality of bushings.

11. The cargo management system of claim 1, further comprising:
- an aft shuttle drive unit coupled to the aft shuttle drive belt and configured to apply aft-ward force to the aft shuttle drive belt; and
- a forward shuttle drive unit coupled to the forward shuttle drive belt and configured to apply forward force to the forward shuttle drive belt.

12. The cargo management system of claim 1, further comprising support beams configured to receive cargo, wherein in response to the slide bushing supported cargo shuttle being positioned beneath the cargo and the top surface being displaced upward, the top surface lifts the cargo from the support beams.

13. The cargo management system of claim 1, further comprising:
- an aft spring and damper assembly that is configured to apply forward force to the aft wedge; and
- a forward spring and damper assembly that is configured to apply aft-ward force to the forward wedge.

14. A slide bushing supported cargo shuttle comprising:
- an aft bushing slide plate;
- a forward bushing slide plate;
- a top surface adapted to be displaced upward;
- an aft wedge positioned between the aft bushing slide plate and the top surface and coupled to an aft shuttle drive belt that is adapted to apply an aft-ward force to the aft wedge;
- a forward wedge positioned between the forward bushing slide plate and the top surface and coupled to a forward shuttle drive belt that is adapted to apply forward force to the at least one forward wedge;
- an aft spring and damper assembly adapted to apply a forward threshold force to the aft wedge; and
- a forward spring and damper assembly adapted to apply an aft-ward threshold force to the forward wedge.

15. The slide bushing supported cargo shuttle of claim 14, wherein the top surface is adapted to be displaced upward in response to the aft shuttle drive belt applying more aft-ward force than the forward threshold force and the forward shuttle drive belt applying more forward force than the aft-ward threshold force.

* * * * *